(12) United States Patent
Minnis

(10) Patent No.: US 9,336,642 B2
(45) Date of Patent: May 10, 2016

(54) SHARED-USE BICYCLE SYSTEMS

(71) Applicant: Simon Minnis, Seattle, WA (US)

(72) Inventor: Simon Minnis, Seattle, WA (US)

( * ) Notice: Subject to any disclaimer, the term of this patent is extended or adjusted under 35 U.S.C. 154(b) by 0 days.

(21) Appl. No.: 14/203,144

(22) Filed: Mar. 10, 2014

(65) Prior Publication Data

US 2014/0277706 A1    Sep. 18, 2014

Related U.S. Application Data

(60) Provisional application No. 61/785,658, filed on Mar. 14, 2013.

(51) Int. Cl.
*G07F 17/00* (2006.01)
*B62H 3/02* (2006.01)
*B62J 11/00* (2006.01)
*B62H 3/00* (2006.01)

(52) U.S. Cl.
CPC .............. *G07F 17/0057* (2013.01); *B62H 3/02* (2013.01); *B62J 11/005* (2013.01); *B62H 2003/005* (2013.01)

(58) Field of Classification Search
USPC ....................................... 700/231–244; 211/5
See application file for complete search history.

(56) References Cited

U.S. PATENT DOCUMENTS

| | | | |
|---|---|---|---|
| 3,924,426 A | 12/1975 | Zane et al. | |
| 4,402,439 A * | 9/1983 | Brown | 224/438 |
| 4,880,097 A | 11/1989 | Speas | |
| 5,647,520 A | 7/1997 | McDaid | |
| 5,917,407 A * | 6/1999 | Squire et al. | 211/5 |
| D626,493 S * | 11/2010 | Dallaire et al. | D12/407 |
| 7,898,439 B2 | 3/2011 | Bettez et al. | |
| 2004/0050807 A1 * | 3/2004 | Cheng | B62H 3/12 211/17 |
| 2009/0139878 A1 * | 6/2009 | Wejrowski | 206/6.1 |
| 2010/0089108 A1 * | 4/2010 | Dutt | B62H 3/02 70/278.7 |
| 2012/0215346 A1 * | 8/2012 | Gingher | G07C 9/00571 700/237 |
| 2014/0207657 A1 * | 7/2014 | Gacs | G06Q 20/42 705/39 |

FOREIGN PATENT DOCUMENTS

EP    1470535 B1    6/2010

OTHER PUBLICATIONS

Big Wheel Bikes, Rentals, Created: Oct. 19, 2006, <http://www.bigwheelbikes.com/rentals.htm>.*

* cited by examiner

*Primary Examiner* — Leslie A Nicholson, III
*Assistant Examiner* — Stephen Akridge
(74) *Attorney, Agent, or Firm* — Klarquist Sparkman, LLP

(57) ABSTRACT

This disclosure is directed to bicycle storage systems and, in particular, to shared-use bicycle systems. Several embodiments herein are directed to a shared-use bicycle system, comprising a bicycle having a locking device and an accessory-receiving area. The locking device can extend horizontally from the bicycle, and the accessory-receiving area being positioned below the locking device. The shared-use bicycle system also comprises a bicycle rack having a horizontally-extending rigid member with at least one opening thereon to receive the locking device of the bicycle in a secured manner. When the bicycle is received in the at least one opening of the bicycle rack in the secured manner, access to the accessory-receiving area of the bicycle is restricted by the horizontally-extending rigid member.

12 Claims, 4 Drawing Sheets

SHARED-USE BICYCLE SYSTEMS

CROSS REFERENCE TO RELATED APPLICATION

This application claims the benefit of U.S. Provisional Application No. 61/785,658 filed Mar. 14, 2013, which is herein incorporated by reference in its entirety.

FIELD OF INVENTION

This disclosure is directed to bicycle storage systems and, in particular, to shared-use bicycle systems.

BACKGROUND

Bicycle sharing enterprises typically allow a user to rent one of a fleet of bicycles for a specified amount of time and/or for a specified fee. Such bicycles are often stored in locking stations or racks, to which the bicycles are securely fixed when not in use. Although the locking mechanisms of such bicycle racks can secure the bicycles, they have very limited, if any, means for storing additional accessories, such as helmets. However, many bicyclists prefer to use helmets for safety reasons and, in some areas helmets are required to be worn when riding bicycles. Accordingly, these and other deficiencies of conventional bicycle racks render them inadequate for many riders and improvements to the locking mechanisms of bicycle racks for bicycle sharing enterprises are desirable.

SUMMARY

Several embodiments herein are directed to a shared-use bicycle system, comprising a bicycle having a locking device and an accessory-receiving area. The locking device can extend horizontally from the bicycle, and the accessory-receiving area being positioned below the locking device. The shared-use bicycle system also comprises a bicycle rack having a horizontally-extending rigid member with at least one opening thereon to receive the locking device of the bicycle in a secured manner. When the bicycle is received in the at least one opening of the bicycle rack in the secured manner, access to the accessory-receiving area of the bicycle is restricted by the horizontally-extending rigid member.

In another representative embodiment, a method of operating a shared-use bicycle system comprises providing a plurality of bicycles having locking devices and accessory-receiving areas. The locking devices can extend horizontally from the bicycles and the accessory-receiving areas can be positioned below the locking devices. The bicycles can be secured to a bicycle rack such that the accessory-receiving areas are inaccessible to a user. The method further comprises receiving a request from a user to rent a bicycle, and releasing a bicycle from the bicycle rack in response to the request such that the user is provided access to the accessory-receiving area.

In another representative embodiment, a bicycle security device comprises an elongated tubular member configured to be mounted on a front portion of a bicycle, a first projection extending laterally from the elongated tubular member, and a helmet-receiving member. The helmet-receiving member can extend laterally from the elongated tubular member, and be substantially coplanar with, and spaced apart from, the first projection along a longitudinal axis of the elongated tubular member. At least one of the first projection and helmet-receiving member can be configured to be received by, and retained in, an opening in a parking rack, so as to secure the bicycle to the parking rack and restrict access to a helmet received by the helmet-receiving member.

The foregoing and other objects, features, and advantages of the invention will become more apparent from the following detailed description, which proceeds with reference to the accompanying figures.

DETAILED DESCRIPTION

Figure 1:
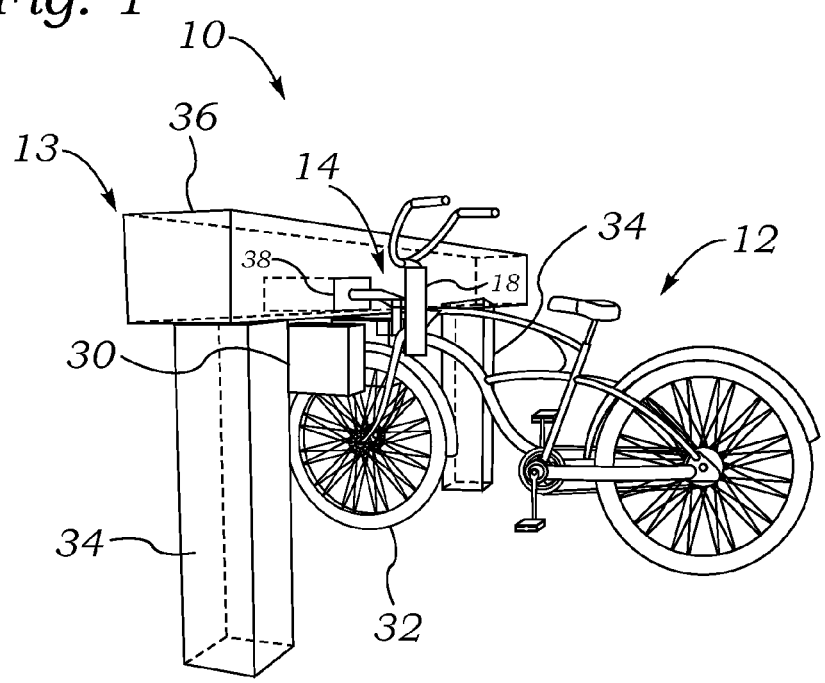
FIG. 1 is a perspective view of a shared bicycle system.
Figure 2:
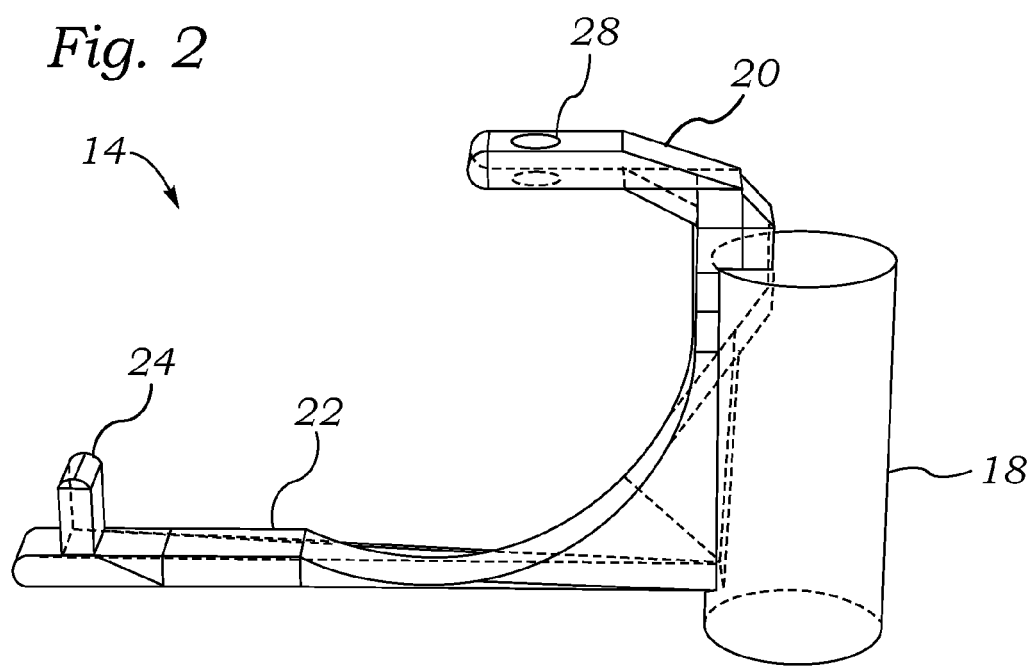
FIG. 2 is a side elevation view of a bicycle security device.

Referring to FIGS. 1-2, there is shown a shared-use bicycle system 10 for securing a bicycle 12. In addition to the bicycle 12, the bicycle system 10 can comprise a bicycle parking rack 13, and a user interface or kiosk 16 (see, e.g., FIG. 7). As used herein, the terms "rack", "parking rack", and "bicycle rack" refer to any structure that is capable of receiving one or more bicycles in a secured manner. As used herein, the terms "user interface" and "kiosk" refer to any mechanism for controlling the securing and releasing of bicycles to and from bicycle racks, whether by mechanical, electrical, and/or computer-controlled means.

The bicycle system 10 can be configured such that a user can rent a bicycle for a specified period of time and or/for a specified fee. In some embodiments, a plurality of shared-use bicycle systems 10 can be located throughout, for example, a metropolitan area, such that a user can rent a bicycle from substantially any location in the metropolitan area.

As shown in FIGS. 1-2, the bicycle 12 can comprise a bicycle security device 14 mounted to a front portion of the bicycle 12. The systems and methods described herein provide a locking device (e.g., a bicycle security device as discussed below) and an accessory-receiving area (e.g., a container or other helmet-receiving area as discussed below). The locking device and accessory-receiving area are positioned so that, when the locking device is secured to a bicycle rack, the accessory-receiving area is also secured so that an item stored or held in that area (e.g., a helmet) cannot be removed from the bicycle or the bicycle rack.

In the embodiment shown in FIG. 2, the bicycle security device 14 can comprise an elongated tube 18 and a first projection 20. The first projection 20 can extend from the elongated tube 18 perpendicular to a longitudinal axis of the tubular member 18 such that the projection 20 is substantially aligned with a longitudinal axis of the bicycle 12 (see, e.g., FIGS. 1, 3-4). The first projection 20 can have a mechanism for securing the bicycle 12 to a parking rack 13. For example, as shown in FIG. 2, first projection 20 comprises an opening 28 for receiving a locking mechanism associated with the parking rack 13. The locking mechanism can be any suitable locking mechanism, such as a deadbolt, that can move into the opening 28 and secure the bicycle 12 to the parking rack 13.

Alternatively, the locking mechanism can also be a magnetic or electromagnetic lock, wherein the bicycle is secured to the rack by, for example, magnetic attraction between an electromagnet located on the bicycle rack and an armature located on the bicycle, or vice versa.

An accessory-receiving area can be positioned below the first projection 20 for storing various accessories. In one embodiment, the accessory-receiving area can comprises a second projection 22 that also extends from the elongated tube 18 in the same general direction as first projection 20. As discussed in more detail below, in some embodiments, a third projection 24 can extend from the second projection 22 to facilitate holding an accessory (e.g., a helmet) in place on the second projection 22. As shown in FIG. 2, third projection 24 can extend in a substantially perpendicular manner from second projection 22.

The security device 14 can be integrally formed with a bicycle so the tubular member 18 is the head tube of the bicycle 12. Alternatively, the security device 14 can be fitted around and/or over the head tube of a bicycle. In this manner, any bicycle can be retrofitted with the security device. In alternative embodiments (not shown), the security device 14 can be secured to and/or formed on any other suitable part of the bicycle 12. For example, instead of extending from a front portion of the bicycle, the security device can extend from a rear portion of the bicycle, such as from the seat post or other structural member on the rear of the bicycle.

Figure 3:
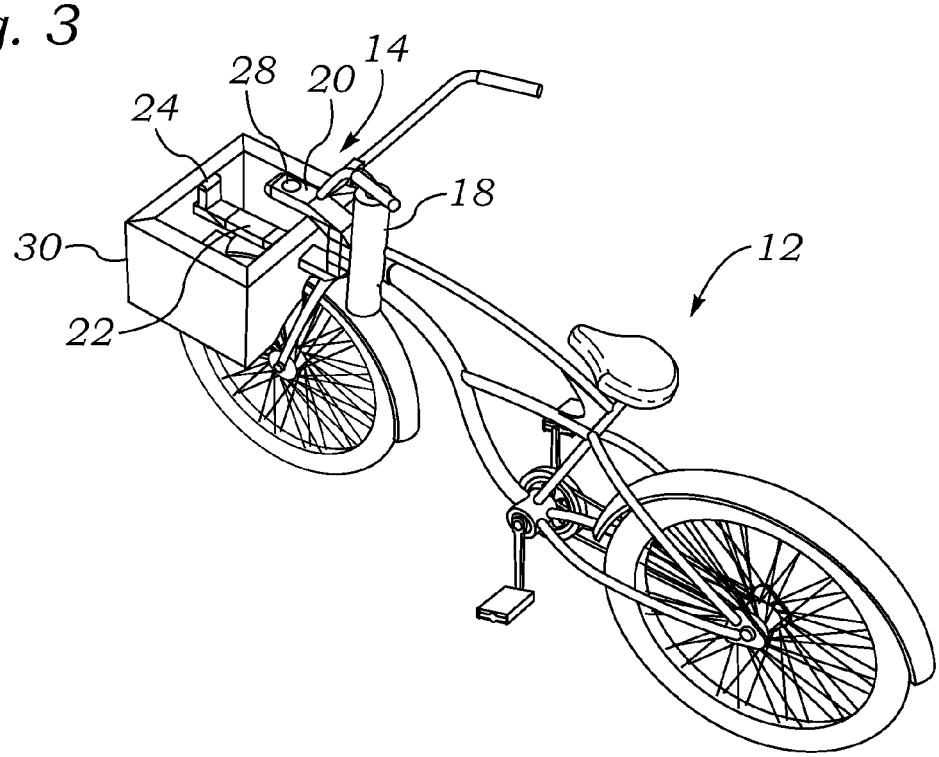
FIG. 3 is a perspective view of a bicycle with the bicycle security device of FIG. 2.
Figure 4:
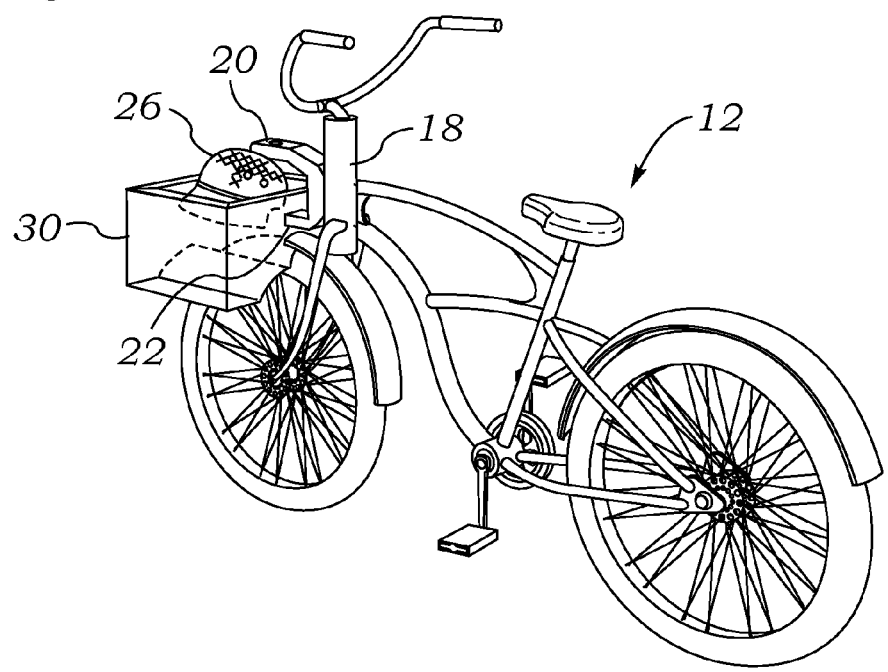
FIG. 4 is a perspective view of the bicycle of FIG. 3.

Referring to FIGS. 1 and 3-4, the accessory-receiving area of the security device 14 can include a container 30, either in addition to the second projection 22 or as an alternative. In some embodiments, the container 30 can be a basket, a rigid box or tote, a pannier, etc., and can be fixedly or releasably attached to the bicycle. In this manner, the user can also place personal items in the container 30 when using the shared bicycle.

The container 30 can be mounted to the front portion of the bicycle such that it extends substantially over and/or around the front wheel 32. As described in more detail below, when used in combination with the security device 14 and a parking rack 13 that has a generally horizontal member 36, the container 30 can extend beneath the horizontal member 36 when the bicycle is secured to the parking rack 13. By extending beneath the horizontal member 36, access to the container 30 can be restricted when the bicycle 12 is secured to the parking rack 13 (see, e.g., FIG. 1). To restrict access to the container 30 when secured to the parking rack 13, the clearance between a lower surface of the horizontal member 36 and an upper surface of the container 30 can be such that a helmet cannot be removed from the container. In some embodiments, the clearance can be such that a person's fingers cannot pass between the lower surface of the horizontal member and the upper surface of the container. In some embodiments, the clearance can be about six inches or less. In alternative embodiments, the clearance can be about two inches or less.

As shown in FIG. 3, if desired, the second projection 22 of the security device 14 can be provided along with the container 30. For example, the second projection 22 can extend through the container 30, as shown in FIG. 3. In some embodiments, the second projection 22 can further facilitate securing one or more bicycle accessories in the container 30, such as a helmet, bicycle lock, detachable bicycle lights, etc.

Referring again to FIG. 1, the parking rack 13 can comprise one or more rigid vertical members 34 overlaid by a rigid horizontal member 36. The horizontal member 36 can comprise one or more openings 38 for receiving the first projection 20 of the bicycle security device 14. In some embodiments, when the first projection 20 is inserted into the opening 38, a sensor (not shown) can detect the presence of the projection. The sensor can communicate with a user interface and/or kiosk so that the user interface and/or kiosk can secure and release the bicycle 12 based on information received from the sensor and/or the user. The user interface and/or sensor can cause a deadbolt to be inserted through the opening 28, thereby securing the bicycle to the parking rack 13.

As discussed above, a parking rack 13 can secure just one bicycle or it can secure a plurality of bicycles 12. If the parking rack 13 is configured to secure a plurality of bicycles 12, it can comprise a plurality of openings 38. These openings, for example, can extend along a length of the horizontal member 36 (on one or both sides of the horizontal member 36) to secure a plurality of bicycles in the manner discussed above.

As shown in FIG. 1, the height relationship between the security device 14 of the bicycle and the horizontal member 36 of the parking rack 13 can be such that the first projection 20 can be received into an opening 38 with the container 30 disposed immediately below the horizontal member 36. In this manner, the first projection 20 of the security device 14 can secure the bicycle to the parking rack, and the horizontal member 36 of the parking rack can prevent access to the contents of the container. This can allow the bicycle 12 to be stored in the parking rack 13 in combination with accessories, such as a helmet 26 (see, e.g., FIGS. 4-5), thereby eliminating the need to provide a separate vending apparatus to supply the accessories. This arrangement can also allow the user to access both the bicycle and the helmet 26 in the container with the single step of removing the bicycle from the parking rack. In some embodiments, the horizontal member 36 can be configured to protect the contents of the container 30 from rain or other ambient conditions by, for example, overhanging or extending beyond the edge of the container.

Figure 5:
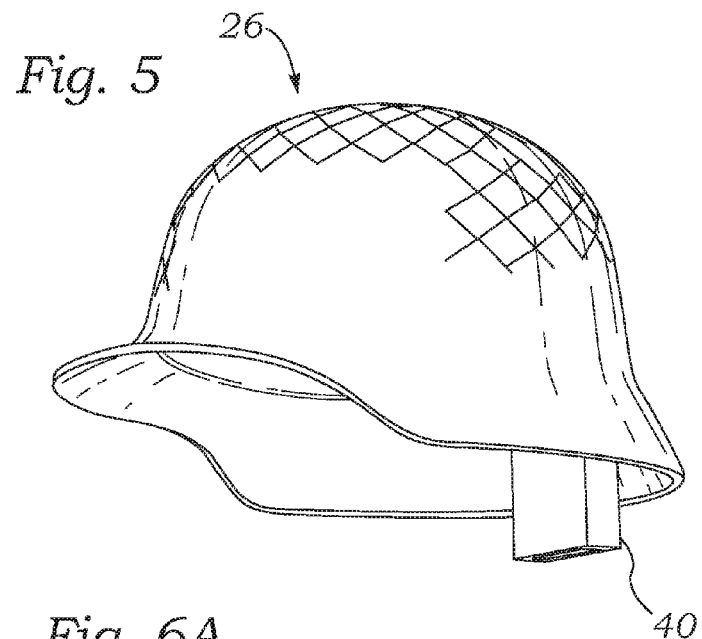
FIG. 5 is a perspective view of a helmet.

As shown in FIG. 5, the helmet 26 can be configured to receive the third projection 24 of the bicycle security device. In some embodiments, the helmet can comprise an opening or slot 40 into which the third projection can extend when the helmet is placed in the container 30. In some embodiments, the third projection can interface with a separate security mechanism of the horizontal member 36 (i.e., a locking mechanism, deadbolt, etc.) such that the helmet can be secured to the parking rack while located inside the container 30. In this manner, the helmet 26 can be physically secured to the parking rack in addition to being located under the horizontal member 36 when the bicycle is secured to the parking rack. However, in alternative embodiments, the third projection 24, in combination with a locking mechanism of the parking rack, can separately secure the helmet such that the horizontal member 36 need not block access to the container 30 to secure the helmet. It should be recognized that this concept is generally applicable to any accessory or item which might be placed in the container 30 and included with a rental of the bicycle.

Figure 6A:
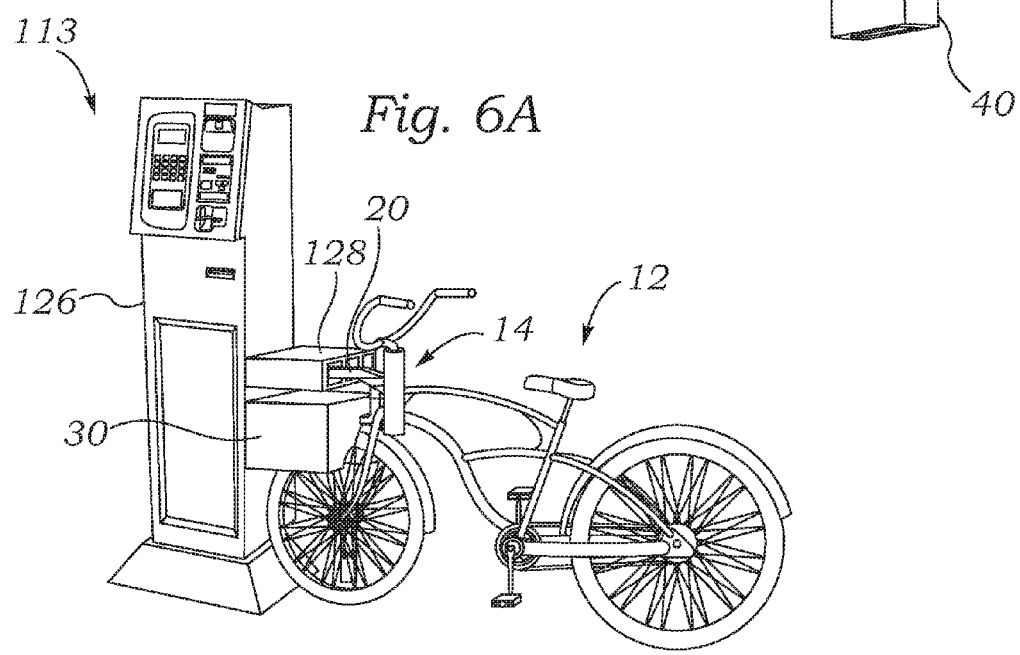
FIG. 6A is a perspective view of an alternative embodiment of a shared bicycle system.
Figure 6B:
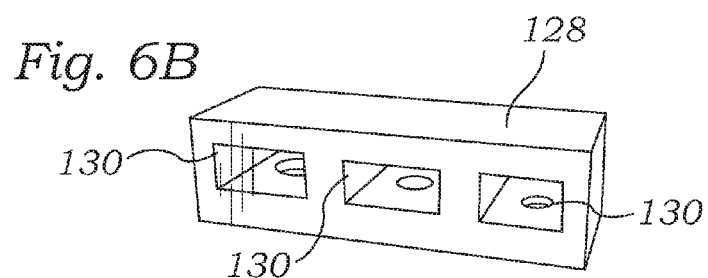
FIG. 6B is a perspective view of the stanchion of the embodiment of FIG. 6A.

An alternative embodiment of a parking rack 113 is shown in FIGS. 6A-B. Instead of a horizontal beam, this embodiment includes one or more horizontally-projecting members. For example, as shown in FIG. 6A, parking rack 113 has a single vertical member 126 with a horizontally-projecting member 128. The horizontally-projecting member 128 can have one or more openings 130 for receiving the first projection 20 of the security device 14 of the bicycle 12, as shown in FIG. 6B. As with other embodiments described herein, when the first projection 20 is inserted into an opening 130, a deadbolt or other locking mechanism can extend through the opening 28 of the first projection, thereby securing the bicycle to the parking rack 113. The horizontally-projecting member 128 can be configured such that when the bicycle is secured to the parking rack, the horizontally-projecting member restricts access to the container 30 in a manner similar to the embodiment of FIG. 1. In this manner, accessories, such as the helmet 26, can be included with the bicycle rental and stored together with the bicycle when not in use.

As shown in FIG. 6B, the horizontally-projecting member 128 can include a plurality of openings 130 to provide flexibility when securing the bicycle to the parking rack in the event of space constraints caused by, for example, walls, curbs, etc. In the embodiment shown in FIG. 6B, the user can secure the bicycle 12 using any of the three available openings 130. Thus, for example, if the parking rack 113 is positioned adjacent a wall of a building, the opening closest to the wall may not be fully accessible to the user and, in this case, the user may choose to use the opening furthest from the wall. Alternatively, a temporary structure or object (e.g., a car) may have been placed in a position that restricts access to one, but not all, of the openings. In this manner, even if access to one opening is blocked or restricted, a user may still be able to utilize the parking rack 113 to secure the bicycle 12.

In some embodiments, the parking rack 113 can be incorporated into an existing fixture or piece of infrastructure, such as a parking meter, light fixture, etc., that can be retrofitted with the horizontally-projecting member 128 and associated electronics. In some embodiments, the parking rack 113 can include a plurality of horizontally-projecting member 128, such as one on each side, for securing multiple bicycles. In alternative embodiments, the horizontally-projecting member 128 can comprise a single opening 130.

Figure 7:
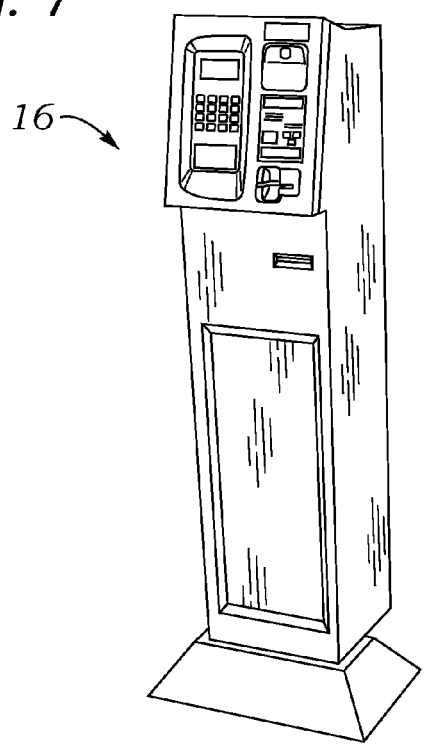
FIG. 7 is a perspective view of a kiosk.

Referring to FIG. 7, the user interface or kiosk 16 can be configured to allow a user to rent a bicycle from the shared bicycle system 10. The kiosk 16 can be in communication with the parking rack 13, and can be configured to perform functionality such as displaying pricing and availability of bicycles to a user, receiving cash or credit card information from the user, and causing the parking rack 13 to unsecure a bicycle for use by the user. In some embodiments, the kiosk 16 can be integrated into the structure of the parking rack 13, or can be freestanding. In some embodiments, the functionality of the kiosk can be accessible remotely, such as over the internet or from a mobile electronic device such as a smart phone or tablet. In some embodiments, the functionality of the kiosk 16 can be incorporated into existing infrastructure, such as a parking meter, such that the existing infrastructure can be retrofitted with a parking rack such as the parking rack 113.

Figure 8:
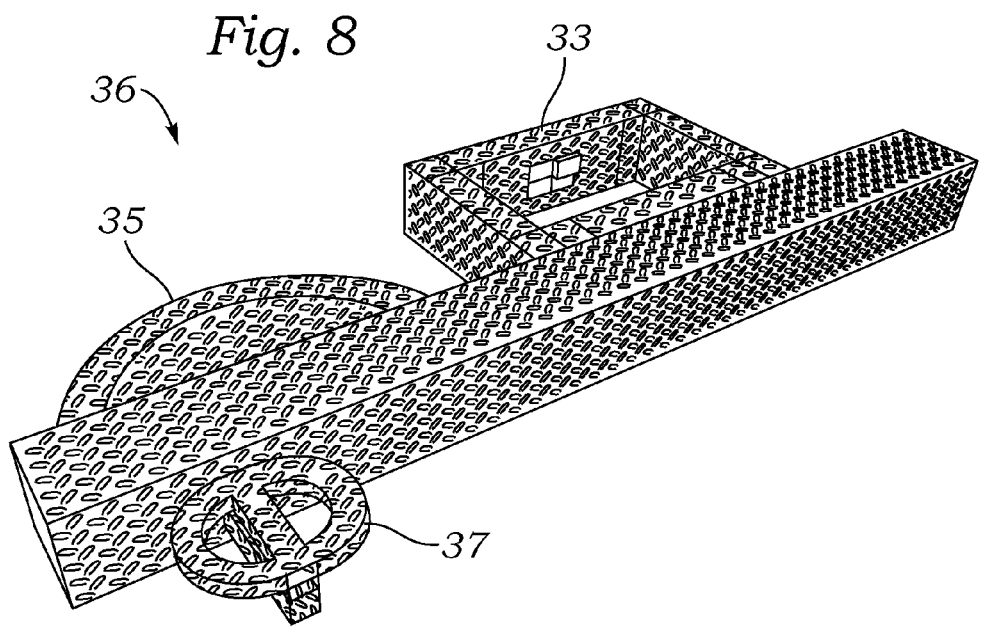
FIG. 8 is a perspective view of an alternative embodiment of a horizontal member of a shared bicycle system.

As discussed above, the horizontally extending member 36 preferably provides shelter for the helmet-receiving area to protect it from the elements. Alternatively, other structures can be provided that restrict access but do not substantially cover the helmet-receiving area. For example, alternative embodiments of the horizontal member 36 can comprise square enclosures 33, semi-annular enclosures 35, and horizontal projections 37, as shown in FIG. 8. When the bicycle is secured to the parking rack, each of these structures extends over the helmet-receiving area to prevent removal of the helmet from that area.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A shared-use bicycle system, comprising:
a bicycle having a security device mounted to the bicycle, the security device comprising a locking device and an adjacent accessory-receiving area sized to receive a helmet, the locking device extending horizontally from the bicycle and the accessory-receiving area being positioned below the locking device; and
a bicycle rack comprising a horizontally-extending rigid member with at least one opening thereon to receive the locking device of the bicycle in a secured state in which the bicycle rack and locking device cooperate to prevent removal of the bicycle from the bicycle rack,
wherein when the bicycle is received in the at least one opening of the bicycle rack in the secured manner, access to the accessory-receiving area of the bicycle is restricted by the horizontally-extending rigid member such that a helmet stored within the accessory-receiving area cannot be removed from the accessory-receiving area unless the bicycle is released from the secured state.

2. The shared-use bicycle system of claim 1, wherein the accessory-receiving area comprises a container.

3. The shared-use bicycle system of claim 1, further comprising a user interface configured such that a user can rent a bicycle together with a helmet stored in the accessory-receiving area of the bicycle from the shared-use bicycle system.

4. A method of operating a shared-use bicycle system, comprising:
providing a plurality of bicycles having locking devices and accessory-receiving areas, the locking devices extending horizontally from the bicycles and the accessory-receiving areas being positioned below the locking devices and sized to receive a helmet, the bicycles being secured to a bicycle rack in a secured state such that the accessory-receiving areas are inaccessible to a user and a helmet stored within the accessory-receiving area cannot be removed from the accessory-receiving area unless the bicycle is released from the secured state;
receiving a request from a user to rent a bicycle; and
releasing a bicycle from the bicycle rack in response to the request such that the user is provided access to the accessory-receiving area.

5. The method of claim 4, further comprising positioning a bicycle helmet within one of the respective accessory-receiving areas, and wherein the releasing step further comprises providing the user access to the helmet in the accessory-receiving area.

6. A bicycle security device, comprising:
an elongated tubular member configured to be mounted on a front portion of a bicycle;
a first projection extending laterally from a longitudinal axis of the elongated tubular member;
a helmet-receiving member extending laterally from the elongated tubular member, the helmet-receiving member being substantially coplanar with, and spaced apart from, the first projection;
wherein at least one of the first projection and helmet-receiving member is configured to be received by, and retained in, an opening in a parking rack, thereby securing the bicycle to the parking rack in a secured state and restricting access to a helmet received by the helmet-receiving member such that a helmet stored within the helmet-receiving member cannot be removed from the helmet-receiving member unless the bicycle is released from the secured state.

7. The bicycle security device of claim 6, wherein the elongated tubular member is a head tube of a bicycle frame.

8. The bicycle security device of claim 6, wherein the first projection and the helmet-receiving member extend forward from a frame of the bicycle.

9. The bicycle security device of claim 6, wherein the helmet-receiving member comprises a container mounted to the bicycle.

10. The bicycle security device of claim 9, wherein when the bicycle is secured to the parking rack, an opening of the container is covered by the parking rack such that access to the container is restricted.

11. The bicycle security device of claim 9, wherein the helmet-receiving member comprises a second projection extending through the container.

12. The bicycle security device of claim 11, wherein the second projection further comprises a third projection extending normal to the second projection for receiving a bicycle helmet.

\* \* \* \* \*